United States Patent
Tumblin et al.

(10) Patent No.: US 11,782,610 B2
(45) Date of Patent: Oct. 10, 2023

(54) WRITE AND COMPARE ONLY DATA STORAGE

(71) Applicant: Seagate Technology LLC, Cupertino, CA (US)

(72) Inventors: Christopher B. Tumblin, Broomfield, CO (US); Jess Lacy, Longmont, CO (US); Michael Barrell, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 298 days.

(21) Appl. No.: 16/777,722

(22) Filed: Jan. 30, 2020

(65) Prior Publication Data

US 2021/0240363 A1 Aug. 5, 2021

(51) Int. Cl.
*G06F 3/06* (2006.01)
*H04L 9/40* (2022.01)
*G06F 21/62* (2013.01)

(52) U.S. Cl.
CPC ............ *G06F 3/0622* (2013.01); *G06F 3/067* (2013.01); *G06F 3/0659* (2013.01); *G06F 21/6218* (2013.01); *H04L 63/08* (2013.01)

(58) Field of Classification Search
CPC ...... G06F 3/0622; G06F 3/0659; G06F 3/067; G06F 21/6218; G06F 21/64; G06F 21/45; G06F 3/0637; G06F 3/065; H04L 63/08; H04L 63/123
See application file for complete search history.

(56) References Cited

U.S. PATENT DOCUMENTS

| | | | | |
|---|---|---|---|---|
| 5,048,085 A | * | 9/1991 | Abraham | G06Q 20/367 713/159 |
| 6,237,008 B1 | * | 5/2001 | Beal | G06F 3/0619 714/E11.107 |
| 6,654,851 B1 | * | 11/2003 | McKean | G06F 3/0601 703/23 |
| 6,711,660 B1 | * | 3/2004 | Milne | G06F 9/4406 714/36 |
| 6,731,536 B1 | * | 5/2004 | McClain | G11C 7/24 365/185.04 |
| 6,907,507 B1 | * | 6/2005 | Kiselev | G06F 11/2056 707/999.202 |
| 7,024,549 B1 | * | 4/2006 | Luu | G06F 9/441 713/1 |

(Continued)

*Primary Examiner* — Aravind K Moorthy
(74) *Attorney, Agent, or Firm* — HOLZER PATEL DRENNAN (57) ABSTRACT

The presently disclosed technology is directed to combatting data theft, particularly of verified authentication data (or hashes thereof) such as login information, thumbprint data, digital signatures, identification numbers, and any other data that should be known to an accessor of stored data. The verified authentication data is initially saved for later comparison in a new type of memory, write-and-compare-only memory, where the data may be queried as to whether a to-be-verified value matches the stored verified value, but the stored and verified data is not read from the write-and-compare-only memory. This prevents a data breach by preventing the verified authentication data from being read by anyone, including those with access (whether legitimate or illegitimate) to any system connected to the write-and-compare-only memory.

16 Claims, 4 Drawing Sheets

(56) References Cited

U.S. PATENT DOCUMENTS

| | | | | |
|---|---|---|---|---|
| 7,103,909 B1* | 9/2006 | Kondo | G06F 21/80 | 713/340 |
| 7,254,719 B1* | 8/2007 | Briceno | G06F 21/10 | 713/168 |
| 7,383,381 B1* | 6/2008 | Faulkner | G06F 3/0607 | 711/114 |
| 7,389,393 B1* | 6/2008 | Karr | G06F 3/067 | 711/156 |
| 7,430,568 B1* | 9/2008 | DeKoning | G06F 11/0727 | |
| 7,743,031 B1* | 6/2010 | Cameron | G06F 3/0611 | 707/649 |
| 8,094,500 B2 | 1/2012 | Paley et al. | | |
| 8,412,837 B1 | 4/2013 | Roskind | | |
| 8,762,635 B1* | 6/2014 | Biro | G11B 20/10527 | 711/112 |
| 8,941,469 B1* | 1/2015 | Diorio | H04L 9/3247 | 340/10.5 |
| 9,098,718 B2 | 8/2015 | O'Hare et al. | | |
| 9,235,474 B1* | 1/2016 | Petri | G06F 11/1471 | |
| 9,910,739 B1* | 3/2018 | Natanzon | G06F 11/2094 | |
| 10,074,391 B1* | 9/2018 | Wang | G11B 5/59638 | |
| 10,083,093 B1* | 9/2018 | Natanzon | G06F 11/1458 | |
| 10,121,033 B1* | 11/2018 | Robshaw | H04L 9/3271 | |
| 2002/0107862 A1* | 8/2002 | Moore | G06F 16/10 | |
| 2005/0005033 A1* | 1/2005 | Powell | G06F 3/0683 | 710/5 |
| 2005/0010767 A1* | 1/2005 | Craft | G06F 21/123 | 713/168 |
| 2005/0038969 A1* | 2/2005 | Schrodinger | G06F 12/1441 | 711/164 |
| 2005/0114896 A1* | 5/2005 | Hug | H04N 21/4325 | 725/90 |
| 2005/0172144 A1* | 8/2005 | Shao | G06F 21/80 | 726/22 |
| 2005/0194480 A1* | 9/2005 | Yoshizawa | B02C 18/0007 | 241/65 |
| 2005/0268054 A1* | 12/2005 | Werner | G06F 11/2074 | 714/E11.107 |
| 2006/0179343 A1* | 8/2006 | Kitamura | G06F 11/2074 | 714/E11.107 |
| 2007/0058450 A1* | 3/2007 | Ferren | G11B 20/0021 | 365/189.05 |
| 2007/0239952 A1* | 10/2007 | Hwang | G06F 11/2069 | 711/162 |
| 2007/0266242 A1* | 11/2007 | Yamaguchi | G06F 12/1408 | 711/E12.092 |
| 2007/0271378 A1* | 11/2007 | Utsumi | G06F 21/80 | 709/225 |
| 2008/0031061 A1* | 2/2008 | Roohparvar | G11C 29/883 | 365/200 |
| 2008/0098469 A1* | 4/2008 | Morijiri | H04L 63/0884 | 726/5 |
| 2008/0104360 A1* | 5/2008 | Takeuchi | G06F 3/0635 | 711/203 |
| 2008/0244172 A1* | 10/2008 | Kano | G06F 11/2069 | 711/112 |
| 2009/0044100 A1* | 2/2009 | Sharp | G06F 12/1425 | 711/163 |
| 2009/0122666 A1* | 5/2009 | Ferren | G11B 23/282 | 369/47.1 |
| 2009/0208002 A1* | 8/2009 | Koehane | H04L 9/002 | 713/189 |
| 2009/0216921 A1* | 8/2009 | Saito | G06F 12/1475 | 710/39 |
| 2010/0017625 A1* | 1/2010 | Johnson | G06F 21/14 | 713/193 |
| 2010/0017670 A1* | 1/2010 | Rosales | G06F 11/1435 | 714/747 |
| 2010/0058004 A1* | 3/2010 | Ferren | G11B 19/122 | 711/E12.001 |
| 2010/0071071 A1* | 3/2010 | Boic | H04N 21/4627 | 711/E12.001 |
| 2010/0138687 A1* | 6/2010 | Noguchi | G06F 11/0727 | 714/47.1 |
| 2010/0241654 A1* | 9/2010 | Wu | G06F 16/188 | 707/769 |
| 2010/0323664 A1* | 12/2010 | Sivaram | H04M 1/66 | 726/28 |
| 2011/0019509 A1* | 1/2011 | Ferren | G11B 17/051 | 369/13.01 |
| 2011/0238915 A1* | 9/2011 | Kikuchi | G06F 12/0866 | 711/118 |
| 2011/0258376 A1* | 10/2011 | Young | G06F 3/0655 | 711/E12.019 |
| 2011/0315763 A1* | 12/2011 | Hochmuth | G06F 21/34 | 235/380 |
| 2012/0155836 A1* | 6/2012 | Brouda | H04N 21/4627 | 386/259 |
| 2013/0007393 A1* | 1/2013 | Taki | G06F 21/79 | 711/163 |
| 2013/0023240 A1* | 1/2013 | Weiner | G06Q 20/401 | 455/411 |
| 2013/0073840 A1* | 3/2013 | Kim | H04L 63/061 | 713/189 |
| 2013/0080828 A1* | 3/2013 | Sheffield | G06F 11/1092 | 714/E11.062 |
| 2013/0305388 A1* | 11/2013 | Kottilingal | G06F 21/6218 | 726/28 |
| 2013/0346691 A1* | 12/2013 | Wu | G06F 21/6272 | 711/E12.001 |
| 2014/0052942 A1* | 2/2014 | Satou | G06F 3/0611 | 711/154 |
| 2014/0195480 A1* | 7/2014 | Talagala | G06F 16/2365 | 707/610 |
| 2014/0208155 A1* | 7/2014 | Pan | G06F 11/2053 | 714/6.21 |
| 2014/0325263 A1* | 10/2014 | Hiraoka | G06F 11/0727 | 714/6.22 |
| 2015/0193634 A1* | 7/2015 | Kim | G06F 21/31 | 713/183 |
| 2015/0347769 A1* | 12/2015 | Espinosa | G06F 21/62 | 726/28 |
| 2016/0261412 A1* | 9/2016 | Lee | H04L 9/3226 | |
| 2016/0371496 A1* | 12/2016 | Sell | G06F 12/14 | |
| 2017/0075631 A1* | 3/2017 | Kikuchi | G06F 3/061 | |
| 2017/0111388 A1* | 4/2017 | Mehta | G06F 21/56 | |
| 2017/0185482 A1* | 6/2017 | Zhang | H03M 13/13 | |
| 2017/0277451 A1* | 9/2017 | Gole | G06F 11/004 | |
| 2018/0024762 A1* | 1/2018 | Compton | G06F 3/061 | 711/162 |
| 2018/0054432 A1* | 2/2018 | Bailey | H04W 12/068 | |
| 2018/0129520 A1* | 5/2018 | Zhang | G06F 9/5077 | |
| 2018/0232249 A1* | 8/2018 | Keohane | G06F 9/5077 | |
| 2018/0260273 A1* | 9/2018 | Lesartre | G11C 29/52 | |
| 2019/0034620 A1* | 1/2019 | Khatri | G06F 21/575 | |
| 2019/0138405 A1* | 5/2019 | Li | G06F 11/2056 | |
| 2019/0286805 A1* | 9/2019 | Law | G06F 21/34 | |
| 2019/0342284 A1* | 11/2019 | Vohra | H04L 63/0807 | |
| 2020/0073828 A1* | 3/2020 | Li | H04L 9/0662 | |
| 2020/0233967 A1* | 7/2020 | Mondello | G06F 21/79 | |
| 2020/0257470 A1* | 8/2020 | Elharrar | G06F 3/0619 | |
| 2020/0311314 A1* | 10/2020 | Troia | H04L 9/3242 | |
| 2020/0313899 A1* | 10/2020 | Troia | G06F 3/0673 | |
| 2021/0089684 A1* | 3/2021 | Cui | G06F 21/6218 | |
| 2021/0103528 A1* | 4/2021 | Pelton | G06F 21/6227 | |

* cited by examiner

WRITE AND COMPARE ONLY DATA STORAGE

BACKGROUND

Data security refers generally to the protection of digital data, such as that stored within one or more databases within an organization's data storage network. In one scenario, authorized black hat users exploit their access to the organization's data storage network to copy data for improper use. In another scenario, unauthorized black hat users gain access to the organization's data storage network via various cyberattacks and also copy data from the organization's data storage network. Both authorized and unauthorized black hat users may then later analyze the copied data to obtain authentication data of other users.

One mechanism unauthorized or authorized black hat users use to gain access is theft of hashed authentication data. More specifically, if a black hat user is able to identify and copy hashed authentication data from the organization's data storage network, the black hat user may later run a variety of hash cracking techniques to recover authentication data corresponding to one or more other users. In various scenarios, the hash cracking techniques can be performed after being disconnected from the organization's data storage network and with the benefit of as much time as needed. The black hat user may then use the recovered authentication data corresponding to one or more other users to conduct identity theft of those users, often as a mechanism to obtain a financial advantage (e.g., money, credit and/or other benefits) in the name of other users.

SUMMARY

Implementations described and claimed herein address the foregoing problems by providing a method of operating an authentication service within a data storage network. The method comprises writing a verified authentication data set to a write-and-compare-only partition of a data storage drive, querying the write-and-compare-only partition for a match between the verified authentication data set and a to-be-verified authentication data set, receiving a match confirmation from the write-and-compare-only partition that the to-be-verified authentication data set matches the verified authentication data set, and authorizing access responsive to receiving the match confirmation from the write-and-compare-only partition of the data storage drive.

Implementations described and claimed herein address the foregoing problems by further providing a data storage network comprising a data storage drive storing verified authentication data set in a write-and-compare-only partition of the data storage drive and a network server. The network server queries the write-and-compare-only partition for a match between the verified authentication data set and a to-be-verified authentication data set, receives a match confirmation from the write-and-compare-only partition that the to-be-verified authentication data set matches the verified authentication data set, and authorizes access responsive to receiving the match confirmation from the write-and-compare-only volume of the data storage drive.

Other implementations are also described and recited herein.

DETAILED DESCRIPTION

Typically, when a user provides authentication information to a security client to obtain access, the security client retrieves hashed authentication data, hashes the provided to-be-verified authentication information, and compares the hashed to-be-verified authentication information against the hashed verified authentication data to determine if the user has provided correct authentication information. If so, the security client grants access to the user. If not, the security client denies access to the user.

To combat data theft, particularly of hashed authentication data, the presently disclosed technology stores the hash lists in a write-and-compare-only volume (or partition) of a data storage drive. Instead of retrieving data from the hash list(s) to authenticate users, the security client queries the write-and-compare-only volume as to whether user-provided to-be-verified authentication information matches an un-hashed version of verified authentication information. If the to-be-verified authentication information matches the verified authentication information stored in the write-and-compare-only volume, the data storage drive sends a match confirmation to the security client, which in turn grants the user access. If the to-be-verified authentication information does not match the verified authentication information stored in the write-and-compare-only volume, the data storage drive sends a match error to the security client, which in turn denies the user access. In the presently disclosed technology, the hashed authentication data are never read from the write-and-compare-only volume of the data storage drive, and thus not able to be copied by a black hat user, even if the black hat user obtains access to the data storage drive.

In other implementations, verified authentication information is stored in an un-hashed state. The presently disclosed technology stores the authentication information in a write-and-compare-only volume (or partition) of a data storage drive. Instead of retrieving the authentication information, the security client queries the write-and-compare-only volume as to whether user-provided to-be-verified authentication information matches the verified authentication information. If the to-be-verified authentication information matches the verified authentication information stored in the write-and-compare-only volume, the data storage drive sends a match confirmation to the security client, which in turn grants the user access. If the to-be-verified authentication information does not match the verified authentication information stored in the write-and-compare-only volume, the data storage drive sends a match error to the security client, which in turn denies the user access. In the presently disclosed technology, the verified authentication information is never read from the write-and-compare-only volume of the data storage drive, and thus not able to be copied by a black hat user, even if the black hat user obtains access to the data storage drive.

Verified authentication information is used herein to mean any data that is stored in the write-and-compare-only volume and can be used for write-and-compare operations to determine a match. To-be-verified authentication information is used herein to mean any data that is used to compare to the verified authentication information to determine if a match is present, and in some implementations, and grant access if a successful match is made. In various implementations, the presently disclosed technology could be used along with drive encryption technology that would additionally protect in the scenario where a very simple password is used (e.g., password123). Such a password may be guessed by a black hat user in few attempts, but the encryption key would be required to obtain access.

Figure 1:
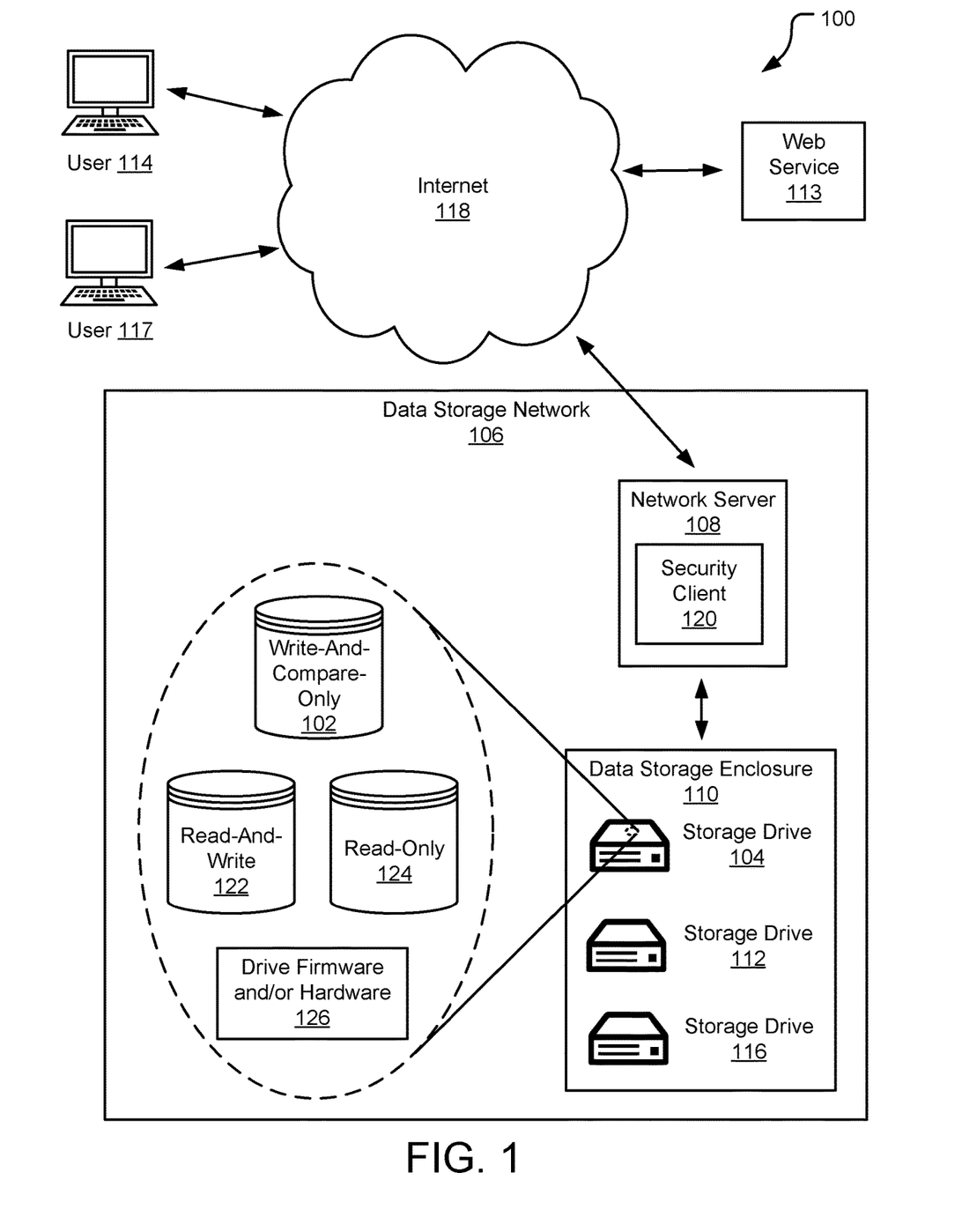
FIG. 1 illustrates an example wide area network system diagram including a write-and-compare-only partition of a data storage drive.

FIG. 1 illustrates an example network 100 system diagram including a write-and-compare-only partition 102 of a data storage drive 104. The network 100 is illustrated as a combination of a wide area network (WAN) and a data storage local area network (LAN) 106, however, the presently disclosed technology could be implemented exclusively on a WAN or LAN.

Network server 108 manages access to a data storage enclosure 110, which includes an array of data storage drives (e.g., storage drives 104, 112, 116). The storage drives 104, 112, 116 store data of behalf of one or more web services (e.g., web service 113) and/or one or more users (e.g., user 114) and may be accessible by the web service(s) and user(s) via the Internet 118. The storage drives 104, 112, 116 individually, or an enclosure thereof containing one or more storage drive such as the storage drives 104, 112, 116 may be referred to herein as a data storage device. The presently disclosed technology may be adopted at the storage drive level, enclosure level, and/or network level, and including various combinations thereof.

Security client 120 manages access to the data storage network 106 provided to the web service(s) and user(s). More specifically, data stored on the storage drives 104, 112, 116 belongs to and/or is only accessible to certain web service(s) and user(s). Further, some of the data stored in the write-and-compare-only partition 102 of the storage drive 104 includes user authentication data, or hash lists thereof. The user authentication data is generally used to authenticate a user requesting access to data on the storage drives 104, 112, 116, access to a web service(s), and/or other access to data available over the Internet 118 but limited to certain users. While implementations of the write-and-compare-only partition 102 described in detail herein store user authentication data, one of ordinary skill in the art will recognize that other forms of data may also be stored within and authenticated using the write-and-compare-only partition 102.

In some implementations, the user authentication data includes a username or user identification paired with an alphanumeric password or passcode. In various implementations, the password or passcode may be one or more of a simple string of characters, single-use passcode, and a time-synchronized one-time passcode. In other implementations, the user authentication data may include a username paired with a digitized user-specific biometric identifier (e.g., a fingerprint, iris scan, facial scan, etc.). In other implementations, the authentication data is associated with an entity (e.g., a business entity) rather than a user. The user authentication data may be stored in a format commonly associated with a key-value store. Further, the user authentication data (e.g., that stored in a key-value format) may include an identifier indicating an intended storage location within the write-and-compare-only partition 102 of the data storage drive 104.

At least the storage drive 104 includes the write-and-compare-only partition 102 of its data storage, which is distinct from other partitions (or volumes) that may be present within the storage drive 104 (e.g., read-and-write partition 122 and read-only partition 124). The write-and-compare-only partition 102 prohibits the data stored therein from being read by the network server 108, or any other client connected to the data storage network 106, including both local clients and remote clients connected via the Internet 118. This is explicitly distinct from the read-and-write partition 122 that permits data to be read from and written thereto depending on the access level granted to the network server 108, or any other client connected to the data storage network 106. This is also explicitly distinct from the read-only partition 124 that permits data to be read from, but not written thereto, also depending on the access level granted to the network server 108, or any other client connected to the data storage network 106.

In some implementations, the data stored in the write-and-compare-only partition 102 is formatted in a manner only capable of being read by drive firmware and/or hardware 126. For example, by only permitting drive hardware to read the write-and-compare-only partition 102, even a hack of drive firmware would not permit a black hat user the ability to read the data stored in the write-and-compare-only partition 102. In other implementations, the drive firmware and/or hardware 126 is instead located at the data storage enclosure 110 level and capable of accessing write-and-compare-only partitions on any or all of storage drives 104, 112, 116. The write-and-compare-only partition 102, read-and-write partition 122, read-only partition 124 are discussed above in terms of specific partitioned areas of the storage volume of the storage drive 104 for convenience. In other implementations, the data between partitions 102, 122, 124 may be distributed throughout the storage drive 104 with a specific identifier indicating the access state (e.g., write-and-compare-only, read-and-write, or read-only) of each block or other grouping of data.

While the aforementioned partitions 102, 122, 124 are explicitly discussed as existing on storage drive 104, similar partitioning may also exist on storage drives 112, 116 and additional storage drives in the data storage enclosure 110. In one implementation, any storage drive within the data storage enclosure 110 that stores hashed authentication data may include the aforementioned partitions 102, 122, 124, particularly the partition 102 to store the hashed user authentication data.

As the hashed user authentication data is not readable (or unreadable) from the storage drive 104, network server 108 contains a hashing program that executes upon request from the security client 120, or by the security client 120 itself. In other implementations, if the user authentication data is considered secure within the write-and-compare-only partition 102, it may be stored in an un-hashed state. If the user authentication data is stored in an un-hashed state, the hashing program may not be required. In other implementations, the drive firmware and/or hardware 126 includes software in addition to or in lieu of the firmware executing on the storage drive 104.

In various implementations, the number of connected user terminals (e.g., user terminals 114, 117) and web services (e.g., web service 113) may vary from one to many, each of which may be connected to and disconnected from the Internet 118 over time. The data storage enclosure 110 is utilized as a central data storage space for the data storage network 106, the user terminals 114, 117, and/or the web service 113. In some implementations, there may be multiple data storage enclosures, each of which may be connected to and disconnected from the storage network 106 over time. In some implementations, the network server 108 may also permit data access between user terminals within the storage network 106 in a similar manner to that described below referencing user terminals 114, 117 connected to the storage network 106 via the Internet 118.

Each data storage enclosure may include one or more storage drives. Quantity (i.e., one or more) and type (e.g., hard disk drives (HDDs), solid state drives (SSDs), flash memory, main memory, hybrid drives, tape drives, etc.) of individual storage drives may vary between data storage enclosures and within individual data storage enclosures. In some implementations, the data storage network 106 is set up as a cloud storage facility for storing data corresponding to numerous users, web services, and other entities that may access the data storage network 106 via the Internet 118.

In an example scenario, user 114 creates a username and password (collectively, user authentication data) in conjunction with establishing a Microsoft® Office 365® account (i.e., web service 113). If available and approved by Office 365®, the user authentication data now assigned to user 114 is transmitted to the data storage network 106 for storage on behalf of Office 365® and the user 114. The approved user authentication data may also be referred to herein as a verified authentication data set. In a key-value scenario, the verified authentication data set includes one or both of a key portion and a value portion of the key. The verified authentication data set is received by the network server 108, which includes an indicator that the received data is user authentication data. The security client 120 executing on the network server 108 then directs the verified authentication data set to be written to the write-and-compare-only partition 102 of the storage drive 104.

In one implementation, the verified authentication data is combined and stored together in the write-and-compare-only partition 102. In another implementation, individual portions of the verified authentication data are separated, where a key portion of the key value (e.g., the username) is stored in traditional memory (or the read-and-write partition 122) and a value portion of the key value (e.g., the password) is stored in the write-and-compare-only partition 102. A location for the key value stored in the write-and-compare-only partition 102 is also stored with the key portion in the traditional memory. When a to-be-verified username/password is later presented for verification, the password stored in the write-and-compare-only partition 102 is queried using the location value stored with the username in traditional memory, for example.

When the user 114 later returns and desires access to their Office 365® account, the user 114 enters their username and password into a web browser associated with Office 365®. Office 365® then submits the received username and password to the data storage network 106 for verification. The username and password submitted for verification may also be referred to herein as a to-be-verified authentication data set. The to-be-verified authentication data set is received by the network server 108, which includes an indicator that the received data is user authentication data to-be-verified. The security client 120 executing on the network server 108 then queries the write-and-compare-only partition 102 of the storage drive 104 as to whether the to-be-verified authentication data set matches the verified authentication data set. If so, the storage drive 104 returns a match confirmation to the security client 120. The security client 120 then directs Office 365® to grant the user access to their Office 365® account.

If the to-be-verified authentication data set does not match the verified authentication data set, the storage drive 104 returns a match error to the security client 120. The security client 120 then directs Office 365® to deny the user 114 access to their Office 365® account. The user may then be prompted to retry the verification process by reentering their username and password. Notably, the user's username and password is not read from the write-and-compare-only partition 102 of the storage drive 104 to perform the aforementioned verification process and consequently, a copy of the user's username and password is not passed to or received by the network server 108. More specifically, the user's username and password may only be passed down from the Internet 118 to the data storage network 106 and ultimately the data storage enclosure 110 for storage, but not retrieved upward to the Internet 118 from the data storage enclosure 110. Only a match confirmation or a match error (as appropriate) is returned from the storage drive 104 to the security client 120.

In some implementations, only a portion (i.e., a fraction of the total length) of the to-be-verified authentication data set is used to obtain a match confirmation when compared with the verified authentication data set. This partial match may be acceptable when the security risk is relatively low, or the verified authentication data set is particularly lengthy and only a partial match is required to obtain the desired security level. In other implementations, a full match (i.e., the to-be-verified authentication data set has an equal length to the verified authentication data set) is required to generate a match confirmation. Requiring a minimum comparison size to perform user authentication prevents a black hat user from attempting to determine the user authentication data set a very small data set at a time (e.g., all the way down to one byte at a time) through a brute force attack on the data storage network 106.

In a further example scenario, user 117 is a black hat user attempting to gain access to the Office 365® account associated with the user 114. The black hat user 117 may first attempt to gain access to the data storage network 106 to copy data from the data storage enclosure 110 that may contain user authentication data. Even if the black hat user 117 is successful in gaining access to the data storage network 106, as the user authentication data is stored in the write-and-compare-only partition 102, the black hat user 117 will be unsuccessful in copying that data from the storage drive 104 as the write-and-compare-only partition 102 is unreadable by design.

The black hat user 117 may next attempt to gain access to the Office 365® account associated with the user 114. As the black hat user 117 does not have the user authentication data associated with the user 114, the black hat user 117 is limited to guessing username/password combinations and submitting them to the security client 120 for the verification process. While the black hat user 117 may repeatedly submit potential username/password combinations to the security client 120, a well-chosen username/password combination will be difficult for the black hat user 117 to guess. Additional measures may be implemented to further frustrate attempts by the black hat user 117 to gain access to the Office 365® account associated with the user 114. These additional measures may include one or more of: imposing a minimum time between queries (e.g., 1 millisecond), a maximum number of unsuccessful consecutive attempts, and requiting additional user authentication steps (e.g., security questions to confirm identity). As a result, it would take an impossible quantity of time for a sequential series of random attacks to be successful to obtain a single piece of the user authentication data. An additional potential security measure pauses attempts (for a predetermined period or until some other security criteria or administrator permission is provided) after a predetermined number of incorrect attempts have been tried. A still further potential security measure specifies that after a predetermined number of incorrect attempts, a notification could be provided to the user and/or a system administrator.

In various implementations, the verified authentication data set is hashed prior to being written to the write-and-compare-only partition 102 of the storage drive 104 (e.g., a 256-bit (32-byte) hash). In some implementations, the security client 120 performs the hashing, while potentially, in other implementations the drive firmware and/or hardware 126 executing on the storage drive 104 performs the hashing. For example, usernames may be stored un-hashed, while corresponding passwords are hashed using a hashing program executing at the security client 120 or the drive firmware and/or hardware 126. For security reasons, the hashing program may be unknown beyond the data storage network 106, the data storage enclosure 110, or the storage drive 104, depending on where within the data storage network 106 the hashing program is executed. Further, the to-be-verified authentication data set is also hashed by the security client 120 or the drive firmware and/or hardware 126 using the same hashing program prior to being compared to the verified authentication data set to determine whether there is a match.

Figure 2:
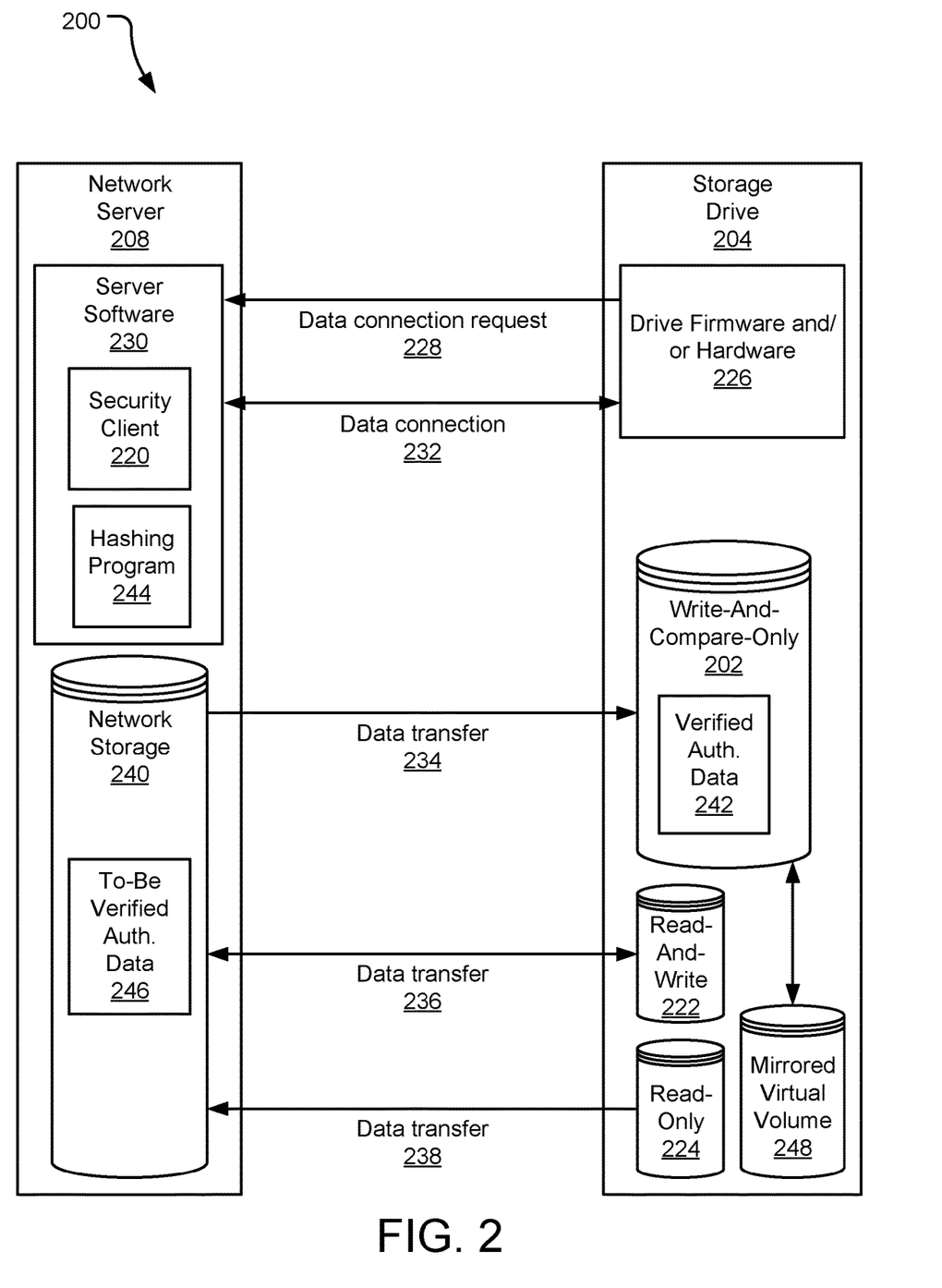
FIG. 2 illustrates an example local area network system diagram including a write-and-compare-only partition of a data storage drive.

FIG. 2 illustrates an example local area network system diagram 200 including a write-and-compare-only partition 202 of a data storage drive 204. In various implementations, data storage drive 204 is one of many data storage drives connected to network server 208 within the local area network. Upon physical connection to a corresponding data storage network (not shown, see e.g., data storage network 106 of FIG. 1), the data storage drive 204 requests data access to the data storage network via data connection request 228. Upon detection of the presence of the storage drive 204 and/or receipt of the data connection request 228, server software 230 establishes a data connection 232 with drive firmware and/or hardware 226. Security client 220 executes within the server software 230 running on the network server 208. In various implementations, the security client 220 and data connection 232 may be initiated concurrently or sequentially, but the security client 220 is running prior to authorizing the transfer of any data between the network server 208 and the storage drive 204. The data connection 232 may include read access, write access, and/or read/write access between the network server 208 and the storage drive 204, depending on the network configuration settings, and discussed in detail below.

The network server 208 includes network storage 240, which may serve as a buffer for data transfers to and from the storage drive 204. The storage drive 204 may include three data partitions; the write-and-compare-only partition 202, a read-and-write partition 222, and a read-only partition 224. The write-and-compare-only partition 202 permits data, particularly user authentication data, to be written to the storage drive 204. However, once the data is written to the write-and-compare-only partition 202, it is prohibited from being read by the network server 208, or any other client connected thereto. This is illustrated by data transfer arrow 234 indicating data flow exclusively from network storage 240 to the write-and-compare-only partition 202. In some implementations, a return message from the write-and-compare-only partition 202 to the network storage 240 indicates that the data was successfully written to the write-and-compare-only partition 202.

The read-and-write partition 222 permits data to be read from and written to the storage drive 204 depending on the access level granted to the network server 208, or any other client connected thereto. This is illustrated by data transfer arrow 236 indicating bidirectional data flow between the network storage 240 and the read-and-write partition 222. The read-only partition 224 permits data to be read from, but not written to the storage drive 204, also depending on the access level granted to the network server 208, or any other client connected thereto. This is illustrated by data transfer arrow 238 indicating data flow exclusively from the read-only partition 224 to the network storage 240.

In some implementations, the data stored in the write-and-compare-only partition 202 is formatted in a manner only capable of being read by the drive firmware and/or hardware 226 and cannot be transferred out of the storage drive 204. The write-and-compare-only partition 202, read-and-write partition 222, read-only partition 224 are discussed above in terms of specific partitioned areas of the storage volume of the storage drive 204 for convenience. In other implementations, the data between partitions 202, 222, 224 may be distributed throughout the storage drive 204 with a specific identifier indicating the access state (e.g., write-and-compare-only, read-and-write, or read-only) of each block or other grouping of data.

The drive firmware and/or hardware 226 may be embedded within a secured portion of the storage drive 204 (e.g., the read-only partition 224) with limited communication and read/write access as compared to other partitions of the storage drive 204 (e.g., the read-and-write partition 222). The drive firmware and/or hardware 226 may also be embedded on a separate storage medium within the storage drive 204 meant specifically for the drive firmware and/or hardware 226 and having limited communication and read/write access (e.g., on an application-specific integrated circuit (ASIC)). In some implementations, the drive firmware is not readable and is located in a write-only section of the storage drive 204 that would only be overwritten using a firmware update mechanism that would have to pass internal checking before overwriting the firmware.

Network server 208 manages access to the storage drive 204, which stores data on behalf of one or more web services (not shown, see e.g., web service 113 of FIG. 1) and one or more users (not shown, see e.g., user 114 of FIG. 1) and may be accessible by the web service(s) and user(s) via the Internet (not shown, see e.g., Internet 118). More specifically, data stored on the storage drive 204 belongs to and/or is only accessible to certain web service(s) and user(s). Further, some of the data stored in the write-and-compare-only partition 202 of the storage drive 204 includes a verified authentication data set 242, or a hash list thereof. The verified authentication data set 242 is generally used to authenticate a user requesting access to data on the storage drive 204, access to a web service(s), and/or other access to data available over the Internet but limited to specific users.

As the verified authentication data set 242 is not readable (or unreadable) beyond the storage drive 204, the network server 208 contains a hashing program 244 that executes upon request from the security client 220 to hash the verified authentication data set 242 prior to being written in the write-and-compare-only partition 202. The hashing program 244 may also hash a to-be-verified authentication data set 246 prior to being compared to the verified authentication data set 242 for user authentication. In other implementations, if user authentication data is considered secure within the write-and-compare-only partition 202, it may be stored as the verified authentication data set 242 in an un-hashed state. If the verified authentication data set 246 is stored in an un-hashed state, the hashing program 244 may not be required. In other implementations, the drive firmware and/or hardware 226 includes software executing on the storage drive 204.

In an example scenario, a user (not shown, see e.g., user 114) creates a username and password (collectively, user authentication data) in conjunction with establishing a Microsoft® Office 365® account. If available and approved by Office 365®, the user authentication data now assigned to the user is transmitted to the network server 208 for storage on behalf of Office 365® and the user. The approved user authentication data may also be referred to herein as the verified authentication data set 242. The verified authentication data set 242 is received by the network server 208, which includes an indicator that the received data is user authentication data. In other implementations, the network server 208 requests the authentication data (e.g., a username and a password), thus the network server 208 is already aware that the received data is user authentication data without a further indicator. The security client 220 executing on the network server 208 then directs the verified authentication data set 242 to be written to the write-and-compare-only partition 202 of the storage drive 204 via the drive firmware and/or hardware 226.

When the user later returns and desires access to their Office 365® account, the user enters their username and password into a web browser associated with Office 365®. Office 365® then submits the received username and password to the network server 208 for verification. The username and password submitted for verification may also be referred to herein as the to-be-verified authentication data set 246. The to-be-verified authentication data set 246 is received by the network server 208, which may include an indicator that the received data is user authentication data to-be-verified. The security client 220 executing on the network server 208 then directs the drive firmware and/or hardware 226 to query the write-and-compare-only partition 202 of the storage drive 204 as to whether the to-be-verified authentication data set 246 matches the verified authentication data set 242. If so, the drive firmware and/or hardware 226 returns a match confirmation to the security client 220. The security client 220 then directs Office 365® to grant the user access to their Office 365® account.

If the to-be-verified authentication data set 246 does not match the verified authentication data set 242, the drive firmware and/or hardware 226 returns a match error to the security client 220. The security client 220 then directs Office 365® to deny the user access to their Office 365® account. The user may then be prompted to retry the verification process by reentering their username and password. Notably, the user's username and password is not read from the write-and-compare-only partition 202 and sent outside of the storage drive 204 to perform the aforementioned verification process. Only a match confirmation or a match error (as appropriate) is returned from the storage drive 204 to the security client 220.

In a further example scenario, a black hat user (see e.g., user 117) is attempting to gain access to the Office 365® account associated with the user. The black hat user may first attempt to gain access to the storage drive 204 to copy data that may contain user authentication data. Even if the black hat user is successful in gaining access to the storage drive 204, as the user authentication data is stored in the write-and-compare-only partition 202, the black hat user will be unsuccessful in copying that data from the storage drive 204.

The black hat user may next attempt to gain access to the Office 365® account associated with the user. As the black hat user does not have the authentication data associated with the user, the black hat user is limited to guessing username/password combinations and submitting them to the security client 220 for the verification process. While the black hat user may repeatedly submit potential username/password combinations to the security client 220, a well-chosen username/password combination will be difficult for the black hat user to guess. Further, additional measures may be implemented to further frustrate attempts by the black hat user to gain access to the Office 365® account associated with the user, as described above.

In various implementations, the verified authentication data set 242 is hashed prior to being written to the write-and-compare-only partition 202 of the storage drive 204. In some implementations, the security client 220 performs the hashing using the hashing program 244, while in other implementations the drive firmware and/or hardware 226 executing on the storage drive 204 performs the hashing. For example, usernames may be stored un-hashed, while corresponding passwords are hashed using the hashing program 244. For security reasons, the hashing program 244 may be unknown beyond the data storage network or the storage drive 204, depending on where the hashing program 244 is executed. Further, the to-be-verified authentication data set 246 may also be hashed by the security client 220 or the drive firmware and/or hardware 226 using the same hashing program 244 prior to being compared to the verified authentication data set 242 to determine whether there is a match.

The storage drive 204 may also include a virtual volume 248 that mirrors the content of the write-and-compare-only partition 202. Rather than querying the drive firmware and/or hardware 226 to determine if the to-be-verified authentication data set 246 matches the verified authentication data set 242, the security client 220 performs a write operation of the to-be-verified authentication data set 246 to the virtual volume 248. The drive firmware and/or hardware 226 then determines if the to-be-verified authentication data set 246 written to the virtual volume 248 matches the verified authentication data set 242 on the write-and-compare-only partition 202. If so, the drive firmware and/or hardware 226 returns a successful write notification to the security client 220 and the security client 220 then authorizes access corresponding to the user. If the to-be-verified authentication data set 246 written to the virtual volume 248 does not match the verified authentication data set 242 on the write-and-compare-only partition 202, the drive firmware and/or hardware 226 returns a write error notification to the security client 220 and the security client 220 then denies access corresponding to the user.

Figure 3:
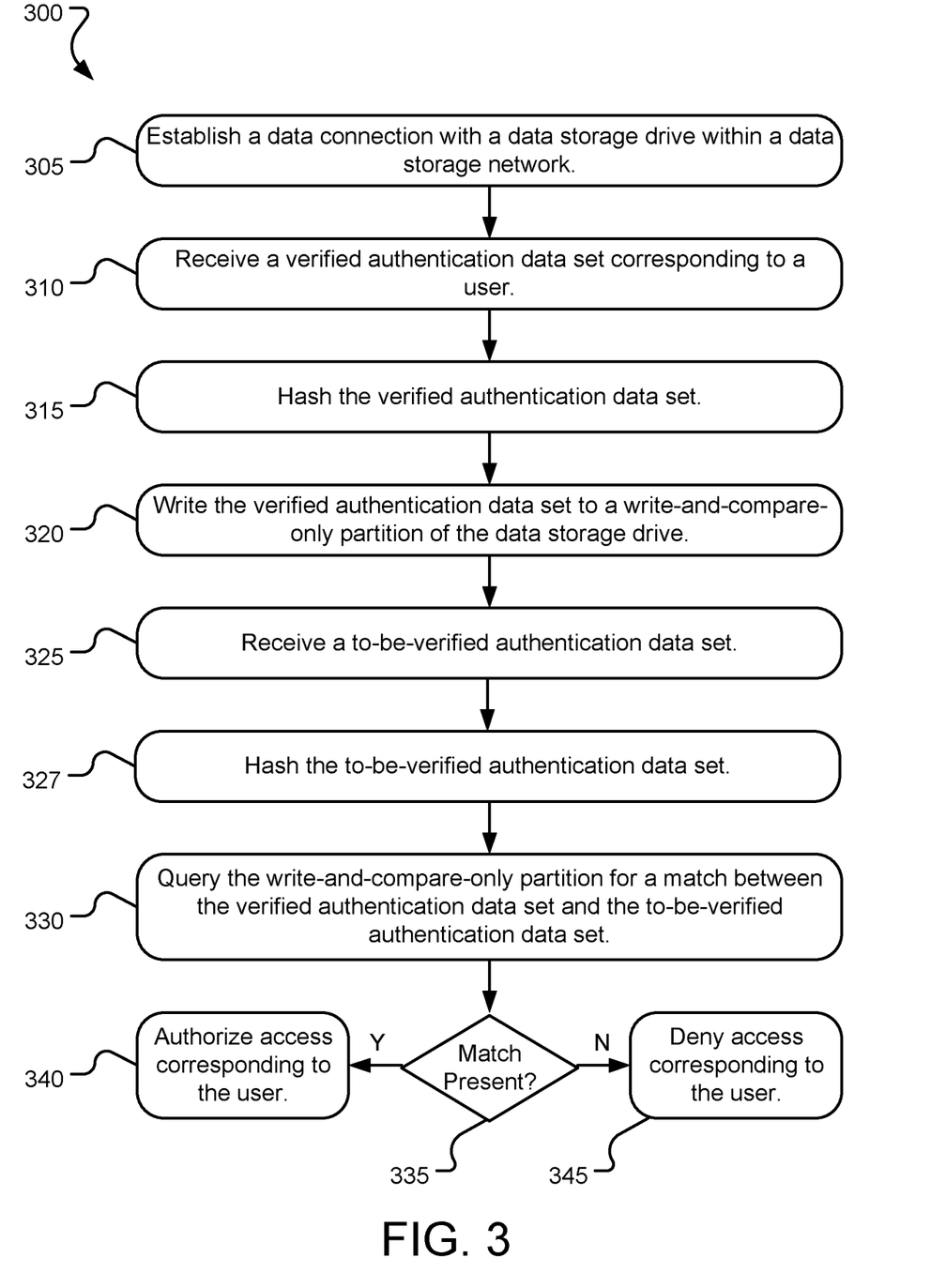
FIG. 3 illustrates example operations for operating a security client to execute user authentication using a write-and-compare-only partition of a data storage drive.

FIG. 3 illustrates example operations 300 for operating a security client to execute user authentication using a write-and-compare-only partition of a data storage drive. An establishing operation 305 establishes a data connection with the data storage drive within a data storage network. In various implementations, the establishing operation 305 includes physically connecting the data storage drive to the data storage network, sending a data connection request from the data storage drive to the data storage network, and a network server granting the data connection request on behalf of the data storage network.

A receiving operation 310 receives a verified authentication data set corresponding to a user. In various implementations, the verified authentication data set includes a user identification and associated password particular to the user (at least with reference to a service that the user is requesting access to) and may be used to later verify the user's identity. An optional hashing operation 315 hashes the verified authentication data set so that it is not sent and stored in a readily readable state.

A writing operation 320 writes the verified authentication data set (hashed or un-hashed) to a write-and-compare-only partition of the data storage drive. The write-and-compare-only partition prohibits the data stored therein from being read by the network server, or any other client connected to the data storage network, including both local clients and remote clients connected via the Internet. This is explicitly distinct from a read-and-write partition that permits data to be read from and written thereto depending on the access level granted to the network server, or any other client connected to the data storage network. This is also explicitly distinct from the read-only partition that permits data to be read from, but not written thereto, also depending on the access level granted to the network server, or any other client connected to the data storage network.

A receiving operation 325 receives a to-be-verified authentication data set from a user requesting access to a web service or data store. A hashing operation 327 hashes the to-be-verified authentication data set so that it may match the hashed verified authentication data set. In some implementations, the hashing operations 315, 327 are omitted.

Querying operation 330 queries the write-and-compare-only partition for a match between the verified authentication data set and the to-be-verified authentication data set. In some implementations, the querying operation 330 may also be referred to as a comparison command and includes several parameters, such as: a specific location on the data storage drive to check (which may include an offset (e.g., byte, sector, entry number, etc.) within a specific sector within the data storage drive), the number of bytes at that specific location to check (which may be implicit based on the to-be-verified authentication data set value), and the to-be-verified authentication data set itself. The verified authentication data set (e.g., the user's username and password) is not read from the write-and-compare-only partition and sent outside of the storage drive to perform the querying operation 330. Only a match confirmation or a match error (as appropriate) is returned from the storage drive to the security client.

In other implementations, individual portions of the verified authentication data are separated, where a key portion of the key value (e.g., the username) is stored in a read-and-write partition and a value portion (e.g., the password) is stored in the write-and-compare-only partition. A location for the key value stored in the write-and-compare-only partition is also stored with the key portion in the traditional memory. When a to-be-verified username/password is later presented for verification in the querying operation 330, the password stored in the write-and-compare-only partition is queried using the location value stored with the username stored in traditional memory.

Decision operation 335 determines if the verified authentication data set matches the to-be-verified authentication data set. The decision operation 335 may be performed by the storage drive firmware and/or hardware so that the verified authentication data set is not read from the storage drive. If the decision operation 335 determines that a match is present, the drive firmware returns a match confirmation to the security client, which in turn authorizes access corresponding to the user in authorizing access operation 340.

In various implementations, the verified authentication data set is capable of being re-written following a successful authorizing access operation 340. If the decision operation 335 determines that a match is not present, the drive firmware returns a match error to the security client, which in turn denies access corresponding to the user in denying access operation 345. In various implementations, the verified authentication data set cannot be re-written following the denying access operation 345 and without a subsequent authorizing access operation 340.

In another implementation, the query operation 330 is performed using a write operation to a virtual volume that mirrors the write-and-compare-only partition of the data storage drive. More specifically, the drive firmware compares the to-be-verified authentication data set written to the virtual volume to the verified authentication data set in decision operation 335. The drive firmware returns a successful write notification if the to-be-verified authentication data set written to the virtual volume matches the verified authentication data set in the write-and-compare-only partition of the data storage drive (resulting in the authorize access operation 340). The drive firmware returns a write error notification if the to-be-verified authentication data set written to the virtual volume does not match the verified authentication data set in the write-and-compare-only partition of the data storage drive (resulting in the deny access operation 345).

In yet another implementation, the query operation 330 is performed using an atomic test-and-set command. More specifically, the drive firmware checks if a to-be-verified authentication data set matches a verified authentication data set. In one implementation, a test-data field of the to-be-verified authentication data set is compared against a test-data field of the verified authentication data set. If a match is present, a match success confirmation is returned to the security client (resulting in the authorize access operation 340). In some implementations, the verified authentication data set (or a set-data-field thereof) is replaced with the to-be-verified authentication data set (or a set-data-field thereof, which may be the same value) and a successful write confirmation is returned to the security client (also resulting in the authorize access operation 340). In other implementations, the verified authentication data set is not replaced with the to-be-verified authentication data set (which is the same value) as the write command is ignored, but a successful match confirmation (e.g., of the test-data fields) is returned to the security client (also resulting in the authorize access operation 340). If the to-be-verified authentication data set does not match the verified authentication data set, a write error notification is returned to the security client (resulting in the deny access operation 345).

While in some implementations, the query operation 330 is used to determine whether grant access to a user (as shown in FIG. 3 and described in detail above). In other implementations, the decision operation 335 that determines whether a match is present is an end in and of itself. For example, the write-and-compare-only partition could be used to validate a user using sensitive user information (e.g., social security numbers), but without granting any particular access. Similar confirmation/validations could be performed with a digital signature that was received from a 3rd party. The security client could also maintain a data set of sensitive user identification information without having that information available for copying but use the write-and-compare-only partition to validate whether a given user identification was in the data set.

The operations 300 may iteratively repeat to authorize access for additional users, or the same user if access is initially denied and the user re-attempts user authentication.

Figure 4:
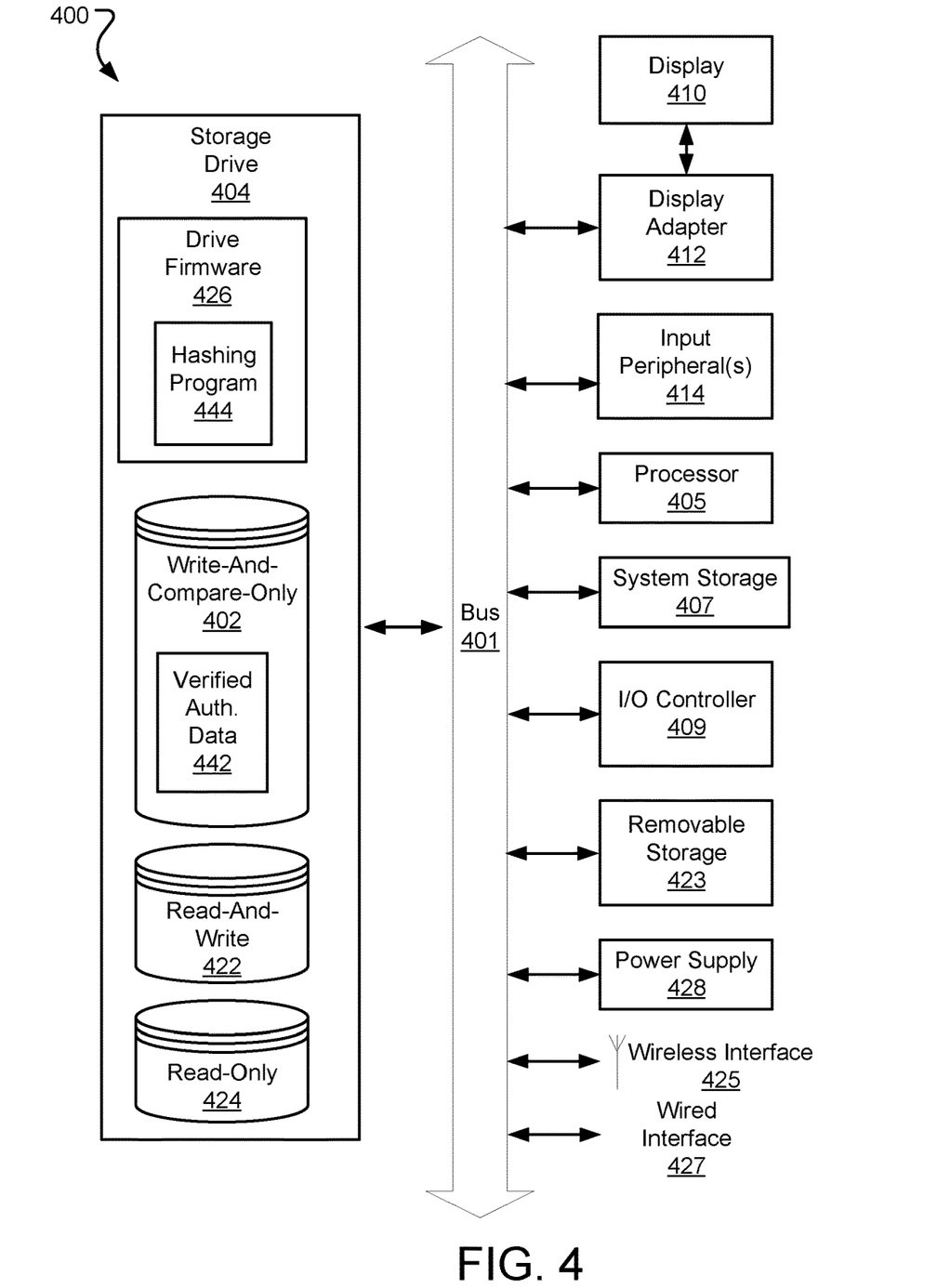
FIG. 4 illustrates an example system diagram of a computer system suitable for implementing aspects of a security client executing user authentication using a write-and-compare-only partition of a data storage drive.

FIG. 4 illustrates an example system diagram of a computer system 400 (e.g., a network server) suitable for implementing aspects of a security client executing user authentication using a write-and-compare-only partition 402 of a data storage drive 404. The storage drive 404 may include one or more of three data partitions, the write-and-compare-only partition 402, a read-and-write partition 422, and a read-only partition 424. The write-and-compare-only partition 402 permits data, particularly user authentication data, to be written to the storage drive 404. However, once the data is written to the write-and-compare-only partition 402, it is prohibited from being read by the computer system 400. In some implementations, the data stored in the write-and-compare-only partition 402 is formatted in a manner only capable of being read by drive firmware/hardware 426.

Computer system 400 manages access to the storage drive 404, which stores data on behalf of one or more web services (not shown, see e.g., web service 113 of FIG. 1) and one or more users (not shown, see e.g., user 114 of FIG. 1) and may be accessible by the web service(s) and user(s) via the Internet (not shown, see e.g., Internet 118). More specifically, data stored on the storage drive 404 belongs to and/or is only accessible to certain web service(s) and user(s). Further, some of the data stored in the write-and-compare-only partition 402 of the storage drive 404 includes a verified authentication data set 442, or a hash list thereof. In various implementations, the storage drive 404 can be organized with a file, block, or object storage format, or perhaps a combination thereof varying across different partitions. The verified authentication data set 442 is generally used to authenticate a user requesting access to data on the storage drive 404, access to a web service(s), and/or other access to data available over the Internet.

As the verified authentication data set 442 is not readable (or unreadable) beyond the storage drive 404, the drive firmware/hardware 426 may contain a hashing program 444 that executes upon request to hash the verified authentication data set 442 prior to being written in the write-and-compare-only partition 402. The hashing program 444 may also hash a to-be-verified authentication data set (not shown, see e.g., to-be-verified authentication data set 246 of FIG. 2) prior to being compared to the verified authentication data set 442 for user authentication. In other implementations, the hashing program 444 is located at a network server level.

The storage drive 404 is connected to a data storage network via the computer system 400, which may be a network server controlling the data storage network (not shown, see e.g., data storage network 106 of FIG. 1). The system 400 includes a bus 401, which interconnects major subsystems such as a processor 405, system storage 407 (such as random-access memory (RAM) and read-only memory (ROM)), an input/output (I/O) controller 409, removable storage (such as a memory card) 423, a power supply 428, and external devices such as a display screen 410 via a display adapter 412, and various input peripherals 414 (e.g., a mouse, trackpad, keyboard, touchscreen, joystick, and/or smart card acceptance device). Wireless interface 425 together with a wired network interface 427, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 4 to be present to practice the presently disclosed technology. Furthermore, devices and components thereof may be interconnected in different ways from that shown in FIG. 4. Code (e.g., computer software, including mobile applications (apps) to implement the presently disclosed technology may be operably disposed in the system storage 407, removable storage 423, and/or the storage drive 404. For example, code for implementing the write-and-compare-only partition 402 described in detail above may be stored in the drive firmware/hardware 426, as shown.

The computing system 400 may include a variety of tangible computer-readable storage media (e.g., the system storage 407, the removable storage 423, and the storage drive 404) and intangible computer-readable communication signals. Tangible computer-readable storage can be embodied by any available media that can be accessed by the computing system 400 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 400.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A method of operating an authentication service within a data storage network, comprising:
    writing a verified authentication data set specific to an approved user to a write-and-compare-only partition of a data storage device, the verified authentication data set being writable to the write-and-compare-only partition but unreadable to any user from the write-and-compare-only partition;
    querying the write-and-compare-only partition for a match between the verified authentication data set and a to-be-verified authentication data set received from the approved user by writing the to-be-verified authentication data set to a virtual volume mirroring the write-and-compare-only partition of the data storage device; and
    receiving a match confirmation from the write-and-compare-only partition that the to-be-verified authentication data set matches the verified authentication data set in the form of a successful write notification of the to-be-verified authentication data.

2. The method of claim 1, further comprising:
    authorizing the approved user access responsive to receiving the match confirmation from the write-and-compare-only partition of the data storage device.

3. The method of claim 1, further comprising:
    querying the write-and-compare-only partition for a match between the verified authentication data set and another to-be-verified authentication data set;
    receiving a match error from the write-and-compare-only partition that the to-be-verified authentication data set does not match the verified authentication data set.

4. The method of claim 3, further comprising:
    denying access responsive to receiving the match error.

5. The method of claim 3, wherein repetition of the querying operation resulting in denying access is limited to a minimum time between queries.

6. The method of claim 1, wherein the query operation and receiving the match confirmation is performed using an atomic test-and-set command.

7. The method of claim 1, further comprising:
    hashing the verified authentication data set prior to writing to the write-and-compare-only partition of the data storage device; and
    hashing the to-be-verified authentication data set prior to querying the write-and-compare-only partition for a match between the verified authentication data set and the to-be-verified authentication data set.

8. A data storage network comprising:
    a data storage device storing a verified authentication data set specific to an approved user in a write-and-compare-only partition of the data storage device, the verified authentication data set being writable to the write-and-compare-only partition but unreadable to any user from the write-and-compare-only partition; and
    a network server to query the write-and-compare-only partition for a match between the verified authentication data set and a to-be-verified authentication data set received from the approved user by writing the to-be-verified authentication data set to a virtual volume mirroring the write-and-compare-only partition of the data storage device, the network server further to receive a match confirmation from the write-and-compare-only partition that the to-be-verified authentication data set matches the verified authentication data set in the form of a successful write notification of the to-be-verified authentication data.

9. The data storage network of claim 8, the network server further to authorize the approved user access responsive to receiving the match confirmation from the write-and-compare-only partition of the data storage device.

10. The data storage network of claim 9, the network server further to hash the verified authentication data set prior to writing to the write-and-compare-only partition of the data storage device, the network server further to hash the to-be-verified authentication data set prior to querying the write-and-compare-only partition for a match between the verified authentication data set and the to-be-verified authentication data set.

11. The data storage network of claim 8, the network server further to query the write-and-compare-only partition for a match between the verified authentication data set and another to-be-verified authentication data set, the network server further to receive a match error from the write-and-compare-only partition that the to-be-verified authentication data set does not match the verified authentication data set.

12. The data storage network of claim 11, the network server further to deny access responsive to receiving the match error.

13. The data storage network of claim 12, wherein repetition of the query operation resulting in denying access is limited to a minimum time between queries.

14. The data storage network of claim 8, wherein the query operation and receiving the match confirmation is performed using an atomic test-and-set command.

15. One or more computer-readable storage media encoding computer-executable instructions for executing on a computer system an authentication service within a data storage network, the authentication service comprising:

writing a verified authentication data set specific to an approved user to a write-and-compare-only partition of a data storage device, the verified authentication data set being writable to the write-and-compare-only partition but unreadable to any user from the write-and-compare-only partition;

querying the write-and-compare-only partition for a match between the verified authentication data set and a to-be-verified authentication data set received from the approved user by writing the to-be-verified authentication data set to a virtual volume mirroring the write-and-compare-only partition of the data storage device;

receiving a match confirmation from the write-and-compare-only partition that the to-be-verified authentication data set matches the verified authentication data set in the form of a successful write notification of the to-be-verified authentication data; and authorizing the approved user access responsive to receiving the match confirmation from the write-and-compare-only partition of the data storage device.

16. The computer-readable storage media of claim 15, the authentication service further comprising:

querying the write-and-compare-only partition for a match between the verified authentication data set and another to-be-verified authentication data set;

receiving a match error from the write-and-compare-only partition that the to-be-verified authentication data set does not match the verified authentication data set; and denying access responsive to receiving the match error.

* * * * *